United States Patent [19]

Hoff

[11] Patent Number: 5,538,286
[45] Date of Patent: Jul. 23, 1996

[54] BULK CEMENT TRANSPORT APPARATUS

[75] Inventor: Thomas M. Hoff, Duncan, Okla.

[73] Assignee: Halliburton Company, Duncan, Okla.

[21] Appl. No.: 117,459

[22] Filed: Sep. 7, 1993

[51] Int. Cl.$^6$ .................................................. B60P 3/22
[52] U.S. Cl. ..................... 280/837; 280/838; 280/839; 220/562; 406/39; 406/41
[58] Field of Search ................. 280/837, 838, 280/839, 830; 406/38, 39, 41, 146, 173; 220/562, 1.5, D24

[56] References Cited

U.S. PATENT DOCUMENTS

| | | | |
|---|---|---|---|
| 2,063,652 | 12/1936 | Woodruff | 406/146 |
| 2,761,522 | 9/1956 | Paradiso et al. | 280/830 |
| 2,850,329 | 9/1958 | Pyle et al. | 406/142 |
| 3,367,724 | 2/1968 | Emery et al. | 406/91 |
| 3,463,460 | 8/1969 | Taylor et al. | 366/3 |

FOREIGN PATENT DOCUMENTS

| | | | |
|---|---|---|---|
| 0323491 | 9/1957 | Canada | 280/839 |
| 0503515 | 12/1954 | Italy | 406/39 |
| 0545401 | 1/1958 | Italy | 280/839 |
| 0730450 | 5/1955 | United Kingdom | 280/839 |

OTHER PUBLICATIONS

Halliburton Services blueprint (278.83986) of a 1400 cubic foot tank trailer sold prior to Aug. of 1992.
Copies of the front cover and pp. 57–69 of Section 1, and pp. 38–43 of Section 3 of Halliburton Services 1990 Equipment Specification Catalog.
Halliburton Serivces Sales & Service Catalog #42 p. 5, Published Prior 1992.

Primary Examiner—Anne Marie Boehler
Attorney, Agent, or Firm—Craig W. Roddy; Stephen R. Christian

[57] ABSTRACT

A bulk material transport apparatus, such as a truck or trailer, having at least one bulk material pressure vessel mounted thereon. The pressure vessel is provided with at least one sealable hatch opening, a first port and a second port all of which are offset from the apex of a torispherical top portion of the pressure vessel. The pressure vessel is provided with at least one discharge port located in a toriconical bottom portion thereof and is also provided with air inlet means for introducing pressurized air into the vessel. An operator platform being positioned at a preselected distance from the offset hatch opening and being within such proximity of the offset hatch opening so as to enable an operator positioned on the operator platform to gain access to the interior of the pressure vessel through the hatch opening is provided.

15 Claims, 4 Drawing Sheets

5,538,286

BULK CEMENT TRANSPORT APPARATUS

The disclosed apparatus relates generally to bulk material transports and more particularly to transports having bulk cement pressure vessels mounted on a mobile base, or chassis, and used in connection with treating wells such as oil, gas, and water production wells.

BACKGROUND

The use of mobile pressure vessels to transport dry granular bulk cement are routinely used in the treating of oil and gas production wells. Typically, prior art vessels have a toriconical, or funnel, shaped bottom portion, a vertical cylindrical side wall, and a torispherical, or dome shaped, top portion. The vessels are typically mounted in tandem on a truck bed or on a tractor trailer, whereupon the vessels can be transported to and/or stored at the site of an oil or gas well. The vessels are designed to allow cement to be loaded into the vessel via a re-closable hatch located on the domed top portion of the vessel prior to being transported to the well site and/or while the vessels are located at the well site. Some prior art vessels are additionally designed to allow for the pneumatic conveyance of the cement into the vessel. Cement is conveyed out of the vessel via an external air supply and aerators and plumbing located within and about the vessels. After being conveyed out of the vessel, the cement is routinely piped into a separator, which serves to reduce and/or eliminate cement plug flow and unwanted cement dust. The cement is then ultimately piped to a mixer where cement, water, and perhaps selected additives are mixed together prior to being pumped downhole.

All too often, during, or in preparation of the conveyance of the cement located within vessels at a job-site, it becomes necessary to gain access to the interior of the prior art vessels to dislodge cement that has become lodged within the vessel for one reason or another including the cement adhering, or caking, to itself or to the sidewalls of the vessel. In order to gain access to the interior of the vessel for inspection, to check on the condition of the cement currently therein, or to attempt to dislodge caked cement, an equipment operator may have to scramble onto the top of the vessel to reach through the hatch located thereon. At a minimum this is an inconvenience, and during inclement weather, scrambling on the domed-shaped top of a vessel having ice or rain on the outer surface can pose a hazard to the operator.

Thus, there is a need for a mobile bulk cement pressure vessel in which access can be gained to the interior thereof with a minimum of inconvenience and to minimize any loss of footing to the operator.

Another shortcoming with prior art mobile bulk cement pressure vessels, especially with vessels mounted in a tandem arrangement, that is one vessel mounted longitudinally in front of the other, is that each vessel, or tank, is specifically constructed to be mounted at the forward position or aft position of the truck body, trailer, or other mobile platform. Each vessel also accommodates manifolding, piping, and venting specific to either the forward mounted vessel or the aft mounted vessel. For example, certain piping will be positioned on the forward tank and the rearward tank for removing the bulk material, or cement, from the tanks and introducing it to a separator which is often located aft of the rearward vessel. Economics and physical limitations usually require that the piping be routed by the most direct route, and thus each vessel will have ports and piping designed specifically for that vessel's location. Therefore, in a typical tandem vessel arrangement, there will be a forward vessel, with appropriately located mounting lugs and ports, and a rearward vessel also having appropriately located mounting lugs and ports. Such an arrangement requires the design and fabrication of two differing, location-specific separate vessels, as well as the costs and time required for obtaining pressure vessel code approval and for maintaining and updating revised shop and maintenance drawings for each vessel and respectively specific piping and manifolding.

Furthermore, when a particular vessel, or component, must be replaced, it must be ordered by a specific part number or other means of positive identification. For example, it must be made clear whether a forward positioned vessel or component is needed, or whether a rearward positioned vessel or component is needed, from either the original fabricator or a regional warehouse. This can become quite a chore and inconvenience when a particular vessel or related component is damaged in remote field locations throughout the world as such locations often times have less than ideal communication and transportation links.

Thus, there is a need for bulk material transport and storage units that may readily be used in a tandem arrangement in either a forward position or a rearward position to reduce the necessity of designing and fabricating two different vessels to meet applicable pressure vessel codes, as well as maintaining and warehousing bulk material vessels and related components specifically designed and constructed for particular locations on a truck body, trailer, or other mobile platform.

SUMMARY OF THE INVENTION

The above objects and needs are fulfilled by the disclosed bulk material transport apparatus. The apparatus includes a mobile base having at least one, and preferably two bulk material pressure vessels mounted thereon in a tandem arrangement. The vessels have a torispherical top portion having an apex, a side wall portion, and a toriconical bottom portion having an apex. The pressure vessels have at least one sealable hatch opening located on the torispherical top portion thereof and the hatch is offset from the apex of the top portion. The pressure vessels further have a first port and a second port located in the top portion, each of which are offset from the apex of the top portion. The second port is located opposite the first port with respect to the apex of the top portion. The pressure vessels are further provided with at least one discharge port located in the bottom portion thereof. Additionally, the pressure vessels are provided with air inlet means for introducing pressurized air into the vessel. An operator platform being interposed between at least one such pair of pressure vessels arranged in tandem relationship. The platform is positioned at a preselected distance from each of the offset hatch openings and is within such proximity of the offset hatch openings of each pressure vessel common to the platform so as to enable an operator positioned on the operator platform to view and gain access to the interior of each pressure vessel through the offset hatch opening located in each vessel.

Preferably, the discharge port of each of the pressure vessels arranged in tandem is offset from the apex of the conical bottom portion and is provided with a second discharge port symmetrically located and positioned opposite the first discharge port enabling each of the vessels arranged in tandem to be fully interchangeable with one another when the vessels are rotated approximately 180° about the vessels' vertical axis.

Preferably, each of the pressure vessels arranged in tandem is provided with a plurality of symmetrically positioned piping brackets located about the periphery of the side wall at preselected locations.

Preferably, each of the pressure vessels arranged in tandem is provided with means for removable and interchangeably securing each pressure vessel to either of the vessel positions within the tandem arrangement.

Preferably, a vent pipe means is provided and is removably attached to one of the ports located on the top portion of each paired vessel and is routed to converge and eventually join with the adjacent vent pipe means at a preselected position between each vessel on a preselected side thereof. Also, a bulk material inlet pipe means is provided and is removable attached to one of the remaining ports located on the top portion of each paired vessel and each material inlet pipe means is routed to converge and eventually join with the adjacent bulk material inlet pipe means at a preselected position between each vessel on a preselected side thereof. Additionally provided is a bulk material discharge pipe means being removably attached to one of the discharge ports located on the bottom portion of the vessel and each bulk material discharge pipe means being routed generally parallel to the mobile base on a preselected side thereof. Finally, means for introducing pressurized air, or gas, into each paired vessel is provided.

DETAILED DESCRIPTION OF THE DRAWINGS

Tandem Bulk Material Transport Truck

Figure 1:
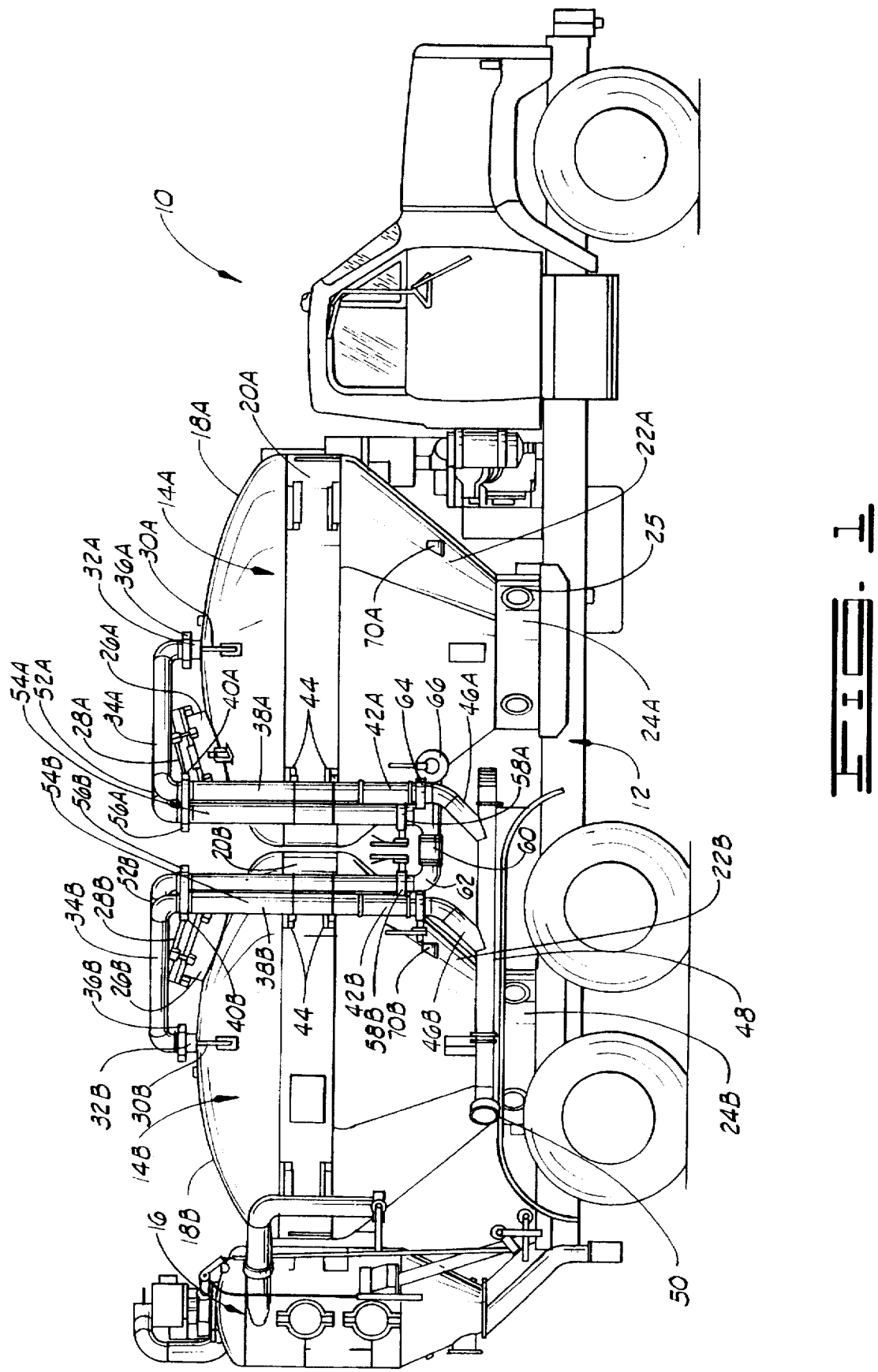
FIG. 1 is a side view of a tandem vessel bulk material transport truck embodying the disclosed invention.

Referring now to FIGS. 1–4 of the drawings, which depict a tandem bulk material transport truck 10 embodying the present invention. Referring now to FIG. 1, which is a right-hand side view of truck 10 which includes a chassis 12 in which bulk material pressure vessels 14A and 14B and separator 16 are removably mounted. Vessels 14A and 14B are fully interchangeable with each other. That is, vessel 14A can be rotated 180° about its vertical axis and be installed as vessel 14B without requiring modifications to accept the various piping shown in the drawings. Likewise, vessel 14B can be rotated 180° about its vertical axis and be installed as vessel 14A without modifications. Furthermore, the majority of the various components are interchangeable and references A and B primarily denote the specific location of installation, i.e., whether the component is affiliated with forward mounted vessel 14A, or rearward mounted vessel 14B. How this interchangeability is achieved will become apparent in the ensuing detailed description of the drawings.

Vessels 14 are preferably constructed of steel and consist of a torispherical upper portion, or head, 18 welded to a cylindrical wall 20 which is welded to a toriconical head, or lower section, 22. Vessels 14 are preferably fabricated to meet or exceed American Society of Mechanical Engineers (ASME) Boiler and Pressure Vessel Code Section VIII, Division 1 as the disclosed invention is particularly useful in over the road transport of bulk material, such as cement, and the pneumatic conveyance of the bulk material into and out of vessels 14. Vessels 14, as shown, each have a volumetric capacity of 200 cubic feet, resulting in a total volumetric capacity of 400 cubic feet for the truck. However, the quantity and capacity of the disclosed vessels may be varied to suit the particular demands to be made of a truck embodying the present invention.

Pressure vessels 14 are mounted to chassis 12 by way of skirts 24 which are preferably welded to the lower region of cone 22. Skirt 24 is in turn preferably welded to a steel angle which is in turn secured to chassis 12 by bolts or other fastening means. Access ports 25 in selected locations about skirts 24 may be provided to facilitate mounting and servicing of vessels 14.

Pressure vessels 14 further include an offset hatch opening 26 having a hatch cover 28 pivotally attached thereto. Hatch 26 is ultimately positioned so as to be proximate to the center of chassis 12, that is, hatches 26A and 26B are adjacent each other with respect to vessels 14A and 14B. Lifting lugs 30, attached to upper portion 18, provide convenient means of attaching a hoist or crane when installing and removing vessels 14 from chassis 12.

Figure 3:
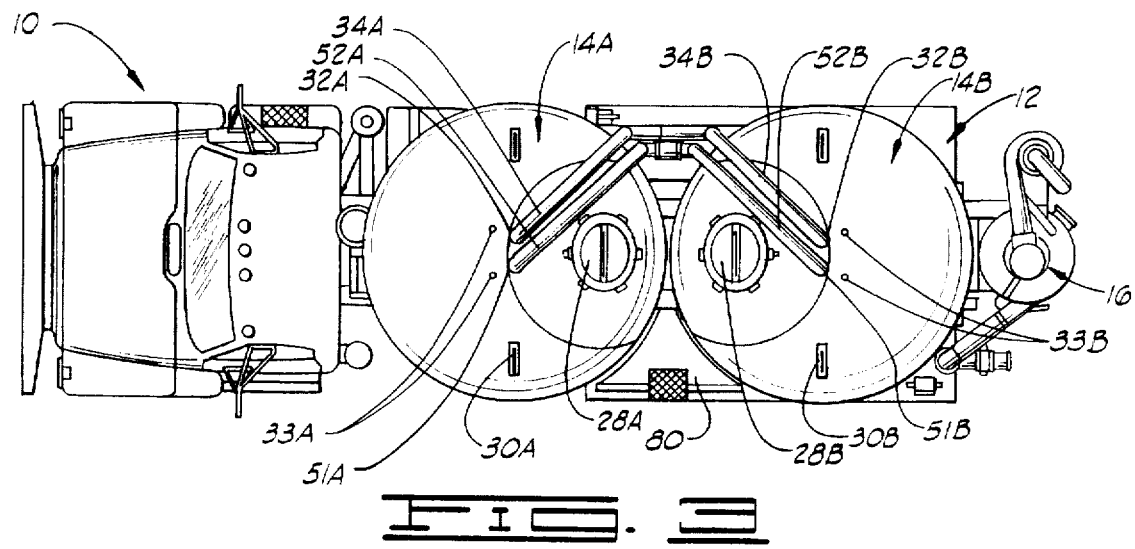
FIG. 3 is a top view of the tandem vessel bulk material transport truck shown in FIG. 1.
Figure 2:
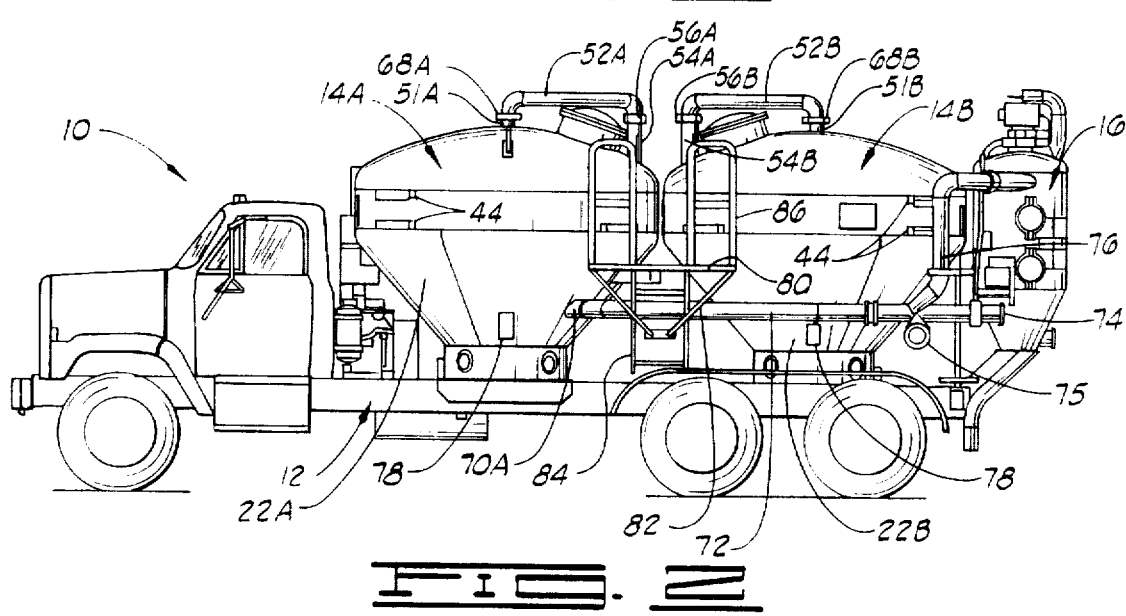
FIG. 2 is an opposite side view of the tandem vessel bulk material transport truck shown in FIG. 1.
Figure 4:
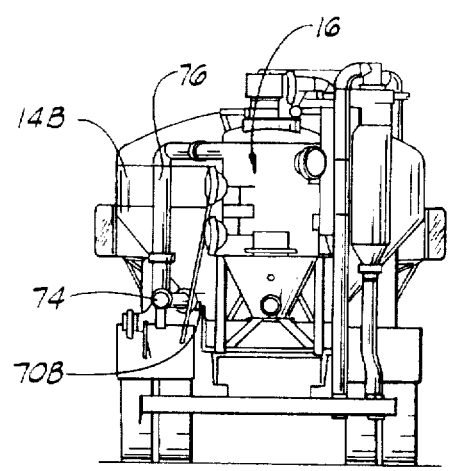
FIG. 4 is a rear view of the tandem vessel bulk material transport truck shown in FIG. 1.

Port 32A, located on top of pressure vessel head 18A, serves as an inlet port for the introduction of preferably dry granular bulk material, such as dry cement, into vessel 14A. Port 32B, located on top of pressure vessel head 18B, also serves as an inlet port for the introduction of bulk material, or cement, into vessel 14B. Ports 32A and 32B are fluidly connected to respective pipe sections 34A and 38A, and 34B and 38B, by way of associated unions 36A and 36B, and 40A and 40B, which are preferably vitaulic clamps known within the art. Pipes 38A and 38B are fluidly coupled with valve sections 42A and 42B, respectively, which are in turn connected to pipes 46A and 46B, respectively. Pipes 46A and 46B are fluidly connected to common inlet manifold 48 having a manifold inlet port 50 that serves as a means for connection to an external bulk material, or cement, supply for pneumatically conveying such material into vessels 14, in lieu of through hatch openings 26. Referring briefly to FIG. 3, which is a top view of the transport truck shown in FIG. 1 of the drawings. Adjacent to inlet ports 32A and 32B are vent ports 51A and 51B, respectively. Vent ports 51A and 51B are fluidly connected with vent pipes 52A and 52B, respectively. Vent pipes 52A and 52B both converge toward the mid right-hand side of chassis 12. Referring now to FIGS. 1 and 2, wherein it can be seen that vent pipes 52A and 52B are joined to vent ports 51A and 52B by unions 68A and 68B, respectively, and are further joined to vertically oriented vent pipes 54A and 54B by unions 56A and 56B, respectively, which can best be seen in FIG. 1. Vertical vent pipes 54A and 54B are fluidly connected to valve sections 58A and 58B, respectively, which in turn are fluidly connected to vent manifold 64. Valve section 58A is connected directly to vent manifold 64 and valve 58B is connected to vent manifold 64 by way of elbow section 62. Vent manifold 64 has a vent outlet port 66 which may be left open to atmosphere or which may be connected to further piping not shown in the drawings.

It should be noted that inlet, or fill, ports 32A and 32B, and vent ports 51A and 51B serve dual functions depending on the orientation of the respective vessels in which they are associated. To illustrate, the top view of transport truck 10 in FIG. 3, shows ports 32A and 51A located on the forward most vessel 14A. Should that vessel be rotated 180° and be placed in the rearward most position, i.e. vessel 14B's orientation and position, what were previously ports 32A and 51A would become ports 51B and 32B, respectively. Such symmetry in port location further contributes to the desired interchangeability between vessels 14. Pipe supports 44 located about the periphery of vessels 14A and 14B provide a convenient means of providing a support for pipes 38 and 54 which run vertically along the vessels. Oppositely positioned, but currently unused, pipe supports 44 are provided so as to enable the vessels to accommodate pipes upon the vessels being interchanged with each other by rotating 180° and repositioning accordingly.

With respect to FIG. 3 of the drawings, air inlet ports 33A and 33B can be seen proximate to ports 32A, 32B, and to ports 51A, 51B, respectively. Ports 33 are used for introducing compressed air by way of external pipes or lines (not shown) into the vessel in order to discharge bulk material, or cement, out of the vessels in accordance with the operation of the described vessels and associated plumbing. Inlet, or fill, ports 33 may also be used for quickly venting the associated vessel if desired.

Referring now to FIG. 2 of the drawings. FIG. 2 reveals a discharge port 70A positioned midway along conical section 22A of vessel 14A. Discharge port 70A is fluidly connected to an internal line (not shown) running to the bottom of conical section 22A. There is a likewise positioned discharge port 70B on vessel 14B which can best be seen in FIG. 4 of the drawings.

Located on the opposite side of conical section 22A, as seen in FIG. 1 of the drawings is a discharge port 70A' which is currently not in use, but would be designated as 70B, if vessel 14A were rotated 180° and repositioned as vessel 14B.

Returning to FIGS. 2 and 4, ports 70A and 70B are fluidly connected by way of piping to a discharge manifold 72 which is connected to separator connecting pipe 76 which leads to separator 16. Discharge manifold 72 further has a discharge port 74 should it be desired to bypass separator 16 and an additional port 75 for filling separator 16 from a vessel located on another truck or trailer. Pipe hangers 78 are located on opposite sides of conical section 22 of each vessel 14A and 14B and serve to provide a convenient means to support discharge manifold 72 or other pipes or manifolds.

Platform 80 is positioned at a predetermined elevation above chassis 12 and at a predetermined elevation from offset hatch openings 26 so as to enable operators easy access into the interior of the vessel via hatch openings 26. This arrangement is in contrast to the previously known arrangement, wherein hatch openings were located in the center of the pressure vessel.

As can be seen in FIG. 3, platform 80 is triangular shaped so as to be nested between vessels 14A and 14B. Platform 80 is provided with struts 82 for stabilizing platform 80. Platform 80 is also provided with a ladder extending downward a predetermined distance therefrom. Platform 80 is further provided with an operator safety rail 86 about the outwardly facing periphery of platform 80. Ladder 84 provides a convenient means for operators to gain access to platform 80 from ground level.

Tandem Bulk Material Transport Trailer

Figure 5:
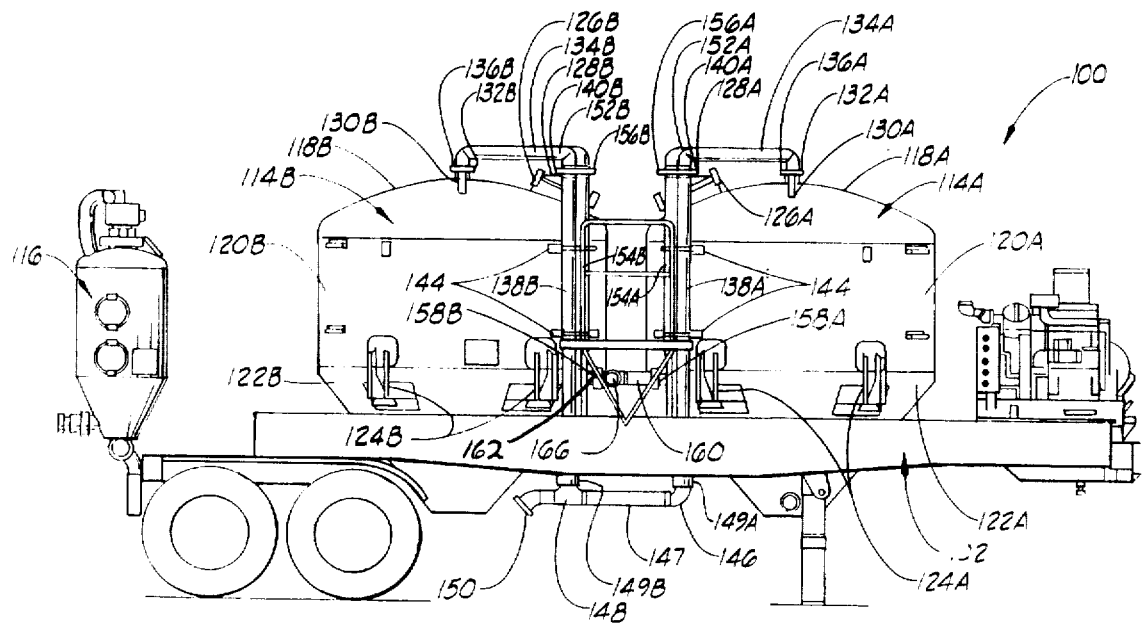
FIG. 5 is a side view of a tandem vessel bulk material transport trailer embodying the present invention.
Figure 6:
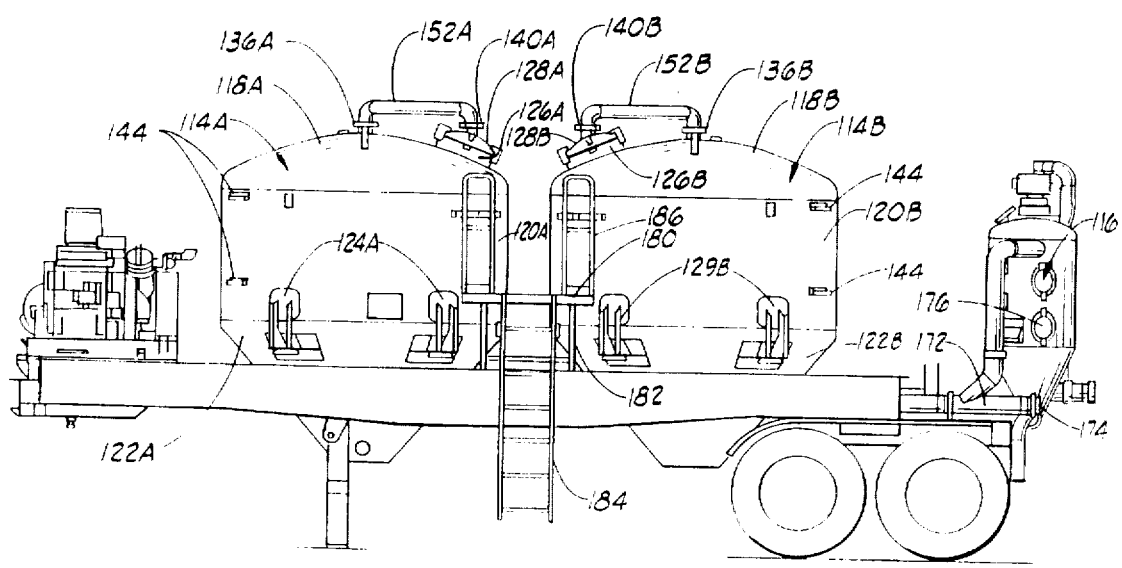
FIG. 6 is an opposite side view of the tandem vessel bulk material transport trailer shown in FIG. 5.

Referring now to FIGS. 5–8 of the drawings, which depict a tandem bulk material transport trailer 100 embodying the present invention. Referring now to FIG. 5, which is a right-hand side view of transport trailer 100 which includes a chassis 102 in which bulk material pressure vessels 114A and 114B and separator 116 are removably mounted. Vessels 114A and 114B are fully interchangeable with each other as previously described with respect to vessels 14 on transport truck 10. Similarly, the majority of the various components are interchangeable and references A and B primarily denote the specific location of installation, i.e., whether the component is affiliated with forward mounted vessel 114A, or rearward mounted vessel 114B.

Pressure vessels 114 are preferably constructed of steel and consist of a torispherical head, or upper portion, 118 welded to a cylindrical wall 120 which is welded to a toriconical head, or lower section, 122. Vessels 114 are preferably fabricated to meet or exceed American Society of Mechanical Engineers (ASME) Boiler and Pressure Vessel Code Section VIII, Division 1 as the disclosed invention is particularly useful in over the road transport of bulk material, such as cement, and the pneumatic conveyance of the bulk material into and out of vessels 114. Vessels 114, as shown, each have a volumetric capacity of 330 cubic feet, resulting in a total volumetric capacity of 660 cubic feet for the trailer. However, the quantity and capacity of the disclosed vessels may be varied to suit the particular demands to be made of a trailer embodying the present invention.

Furthermore, upper portions 118 and lower portions 122 of the 330 cubic foot vessel are the same size and configuration of the corresponding upper portion 18 and lower portion 22 of the 200 cubic foot vessels shown mounted on truck chassis 12 shown in FIG. 1. As such shaped portions can be difficult and expensive to form, such usage of the upper and lower portions in vessels having differing volumes is economically attractive and further enhances the benefits and advantages offered by the present invention.

Pressure vessels 114 are mounted to chassis 102 by way of mounting lugs 124 that are located about the periphery of vessels 114 at preferably four locations and are welded thereto. Lugs 124 are preferably bolted to chassis 102 in order to facilitate the replacement of the vessel thereon.

Figure 7:
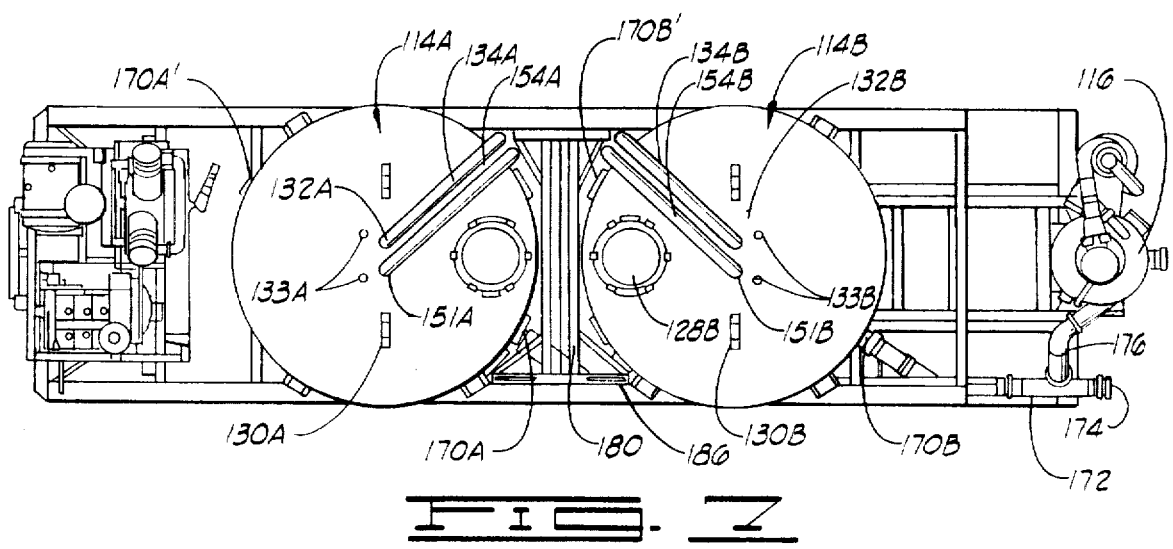
FIG. 7 is a top view of the tandem vessel bulk material transport trailer shown in FIG. 5.
Figure 8:
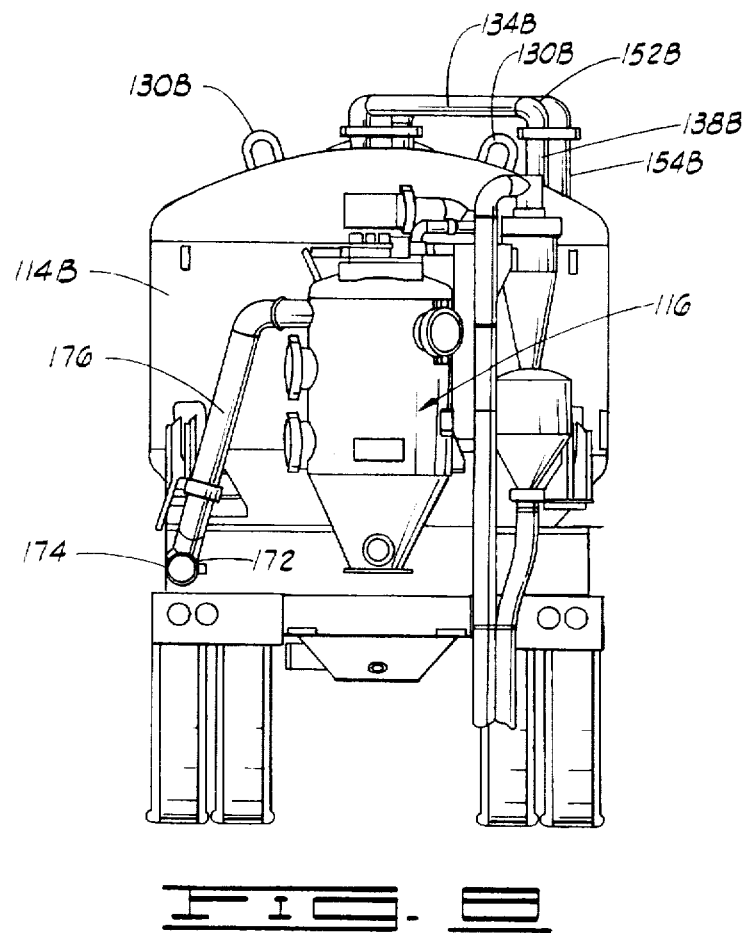
FIG. 8 is an end view of the tandem vessel bulk material transport trailer shown in FIG. 5.

Vessels 114 each further include an offset hatch opening 126 having a hatch cover 128 pivotally attached thereto. Hatch 126 is ultimately positioned so as to be proximate to the center of chassis 102, that is, hatches 126A and 126B are adjacent each other with respect to vessels 114A and 114B. Lifting lugs 130, attached to heads 118, provide convenient means of attaching a hoist or crane when installing and removing vessels 114 from chassis 112. Port 132A, located on top of pressure vessel head 118A, serves as an inlet port for the introduction of bulk material, or cement, into vessel 114A. Port 132B, located on top of pressure vessel head 118B, also serves as an inlet port for the introduction of bulk material, or cement, into vessel 114B. Ports 132A and 132B are fluidly connected to respective pipe sections 134A and 138A, and 134B and 138B by way of associated unions 136A and 136B and 140A and 140B, which are preferably vitaulic clamps known within the art. Pipes 138A and 138B are fluidly coupled with valve sections 142A and 142B, respectively, which are in turn connected to pipes 146A and 146B, respectively. Pipes 146A and 146B are fluidly connected to common inlet manifold 148 having a manifold inlet port 150 that serves as a means for connection to an external bulk material, or cement, supply for pneumatically conveying such material into vessels 114, in lieu of through hatch openings 126. Referring briefly to FIG. 7, which is a top view of the bulk material transport trailer shown in FIG. 5 of the drawings. Adjacent to inlet ports 132A and 132B are vent ports 151A and 151B, respectively. Vent ports 151A and 151B are fluidly connected with vent pipes 152A and 152B, respectively. Vent pipes 152A and 152B both converge toward the mid right-hand side of chassis 102. Referring now to FIGS. 5 and 7, wherein it can be seen that vent pipes 152A and 152B are joined to vent ports 151A and 151B by unions 168A and 168B, respectively, and are joined to vertically oriented vent pipes 154A and 154B by unions 156A and 156B, respectively, which can best be seen in FIG. 1. Vertical vent pipes 154A and 154B are fluidly connected to valve sections 158A and 158B, respectively, which in turn are fluidly connected to vent manifold 166. Valve section 158A is connected directly to vent manifold 166 and valve 158B is connected to vent manifold 166 by way of elbow section 162. Vent manifold 164 has a vent outlet port 166 which may be left open to atmosphere or which may be connected to further piping not shown in the drawings.

It should be noted that inlet ports 132A and 132B, and vent ports 151A and 151B serve dual functions depending on the orientation of the respective vessels in which they are associated. To illustrate, the top view of transport trailer 110 in FIG. 7, shows ports 132A and 151A located on the forward most vessel 114A. Should that vessel be rotated 180° and be placed in the rearward most position, i.e. vessel 114B's orientation and position, what were previously ports 132A and 151A would become, in effect, ports 151B and 132B, respectively. Such symmetry in port location contributes to the desired interchangeability between vessels 114. Pipe supports 144 located about the periphery of vessels 114A and 114B provide a convenient means of providing a support for pipes 138 and 154 running vertically along the vessels. Oppositely positioned and unused pipe supports 144 are provided so as to enable the vessels to be interchanged with each other by rotating 180° and repositioning.

With respect to FIG. 7 of the drawings, air inlet ports 133A and 133B can be seen proximate to ports 132A, 132B, and to ports 151A, 151B, respectively. Ports 133 are used for introducing compressed air by way of external pipes or lines (not shown) into the vessels in order to discharge bulk material, or cement, out of the vessels in accordance with the operation of the described vessels and associated plumbing. Ports 133 may also be used for quick venting of the associated vessel if desired.

Referring now to FIG. 7 of the drawings. FIG. 7 reveals the end of a discharge port 170A extending outward from conical section 122A of vessel 114A. Discharge port 170A is fluidly connected to an internal line running to the bottom of conical section 122A (not shown). There is a likewise positioned discharge port 170B on vessel 114B. Located on the opposite side of conical section 122A, is discharge port 170A', which is currently not in use, but would be designated 170B if vessel 114A were rotated 180° and installed as vessel 114B.

Returning to FIGS. 6 and 8, ports 170A and 170B are fluidly connected by piping to a discharge manifold 172 which is connected to separator connecting pipe 176 which leads to separator 116. Discharge manifold 172 further has a discharge port 174 should it be desired to bypass separator 116.

Platform 180 is positioned at a predetermined elevation above chassis 102 so as to enable operators easy access to offset hatch openings 126. This arrangement is in contrast to the previously known arrangement, wherein hatch openings were located in the center of the pressure vessel and could not be reached by the operator while standing on a platform. As can be seen in FIG. 7, platform 180 is generally rectangularly shaped so as to be nested between vessels 114A and 114B. Platform 180 is provided with struts 182 for stabilizing platform 180. Platform 180 is also provided with a ladder extending downward a predetermined distance therefrom. Platform 180 is further provided with a safety rail 186 about the outwardly facing periphery of platform 180. Ladder 184 serves as a convenient means for operators to gain access to platform 180 from ground level.

Furthermore, with respect to the vessels 14 and 114 described herein, particularly when using head portions and cone portions of the same configuration and size, much of the associated piping and manifolding can also be used interchangeably among vessels of different capacities thereby further contributing to the advantages of the disclosed invention. For example piping 34A and 34B are identical to 134A and 134B. Similarly, piping 52A and 52B are identical to 154A and 154B.

Operation of the Invention

The following discussion applies to both, the disclosed bulk material transport truck and the tractor trailer, as well as any mobile bulk material transport apparatus having the disclosed features, as the operation thereof is very similar.

A dry bulk material is loaded into vessels 14 by way of the offset adjacently located hatches. The offset adjacent hatches of the disclosed invention now make it possible to load both vessels from a gravity fed source via a hose without having to reposition the truck, trailer, or other platform on which the vessels are mounted. This feature can result in significant time savings for the operator of a truck, tractor-trailer, or other mobile platform embodying the disclosed invention in comparison to the centrally located hatch openings of prior art mobile bulk material pressure vessels.

As an alternative to loading vessels 14, and 114, through respective hatch openings 26, and 126, the pressure vessels may be loaded pneumatically at a remote material source, or at the wellsite, by way of bulk material inlet manifold 48, and 148, and associated valves and piping. When pneumatically loading bulk material into the vessels, the vents, located on top of the vessels, and associated valve sections and piping can be used to control the venting of vessels as air is displaced from the vessels during the loading of bulk material.

Bulk material stored in the pressure vessels may be evacuated individually, or in combination, via the discharge ports and associated manifolding and piping of each vessel. The bulk material is evacuated from the vessels by introducing pressurized air, or other gas, into vessels 14, or 114, via inlet ports 33 and 133 respectively, by way of a flexible hose, line, or piping (not shown) and originating from a pressurized air supply 9 (not shown). The flow rate of the material being evacuated is controlled by adjusting the inlet air pressure and if need be, by making adjustments to separator 16, or 116, if being routed therethrough.

The particular configuration and location of operator platforms 80, and 180, in conjunction with the centralized location of the hatch openings and the piping, valving, and manifolding being centrally routed and located, as shown and described above, provides operators standing on the platform with access to the various valving for venting and controlling air supply and access to both hatches from a centrally located platform.

Although, the disclosed invention has been shown and described with respect to a truck and a tractor drawn trailer embodying the present invention, it will be apparent that the claim invention is not limited to such, and that modifications and changes may be made to the claimed invention without departing from the spirit and scope thereof.

What is claimed:

1. A bulk material transport apparatus, comprising:

a mobile base having two interchangeable bulk material pressure vessels mounted thereon, wherein each vessel includes a top portion with an apex, a side wall portion, and a bottom portion with an apex;

each pressure vessel having a sealable operator access hatch opening located on the top portion thereof and being offset from the apex of the top portion;

each pressure vessel having a first port located in the top portion thereof and being offset from the apex of the top portion;

each pressure vessel having a second port located in the top portion thereof, being offset from the apex of the top portion, and being located opposite the first port with respect to the apex of the top portion;

each pressure vessel having a discharge port located in the bottom portion thereof;

each pressure vessel having air inlet means for introducing pressurized air into the vessels;

each pressure vessel having vent pipe means removably attached to one of the ports located on the top portion thereof, wherein each vent pipe means is routed to converge and eventually join with the adjacent vent pipe means at a preselected position between each vessel on a preselected side thereof;

each pressure vessel having bulk material inlet pipe means removably attached to one of the remaining ports located on the top portion thereof, wherein each material inlet pipe means is routed to converge and eventually join with the adjacent bulk material inlet pipe means at a preselected position between each vessel on a preselected side thereof;

each pressure vessel having bulk material discharge pipe means removably attached to one of the discharge ports located on the bottom portion thereof, wherein each bulk material discharge pipe means is routed generally parallel to the mobile base on a preselected side thereof; and an operator platform positioned at a preselected distance from the offset hatch openings and within such proximity of the offset hatch openings so as to enable an operator positioned on the operator platform to gain access to the interior of the pressure vessels through the hatch openings without having to step off the platform.

2. The bulk transport apparatus of claim 1, wherein:

the pressure vessels are mounted in a tandem arrangement with a forwardly positioned vessel and a rearwardly positioned vessel with respect to the mobile base and are mounted on the mobile base within a preselected distance of each other; and wherein the operator platform is interposed between the tandemly arranged vessels.

3. The bulk transport apparatus of claim 2, wherein:

the discharge port of each pressure vessel is arranged in tandem being offset from the apex of the bottom portion and being provided with a second discharge port symmetrically located and positioned opposite the first discharge port enabling each of the vessels arranged in tandem to be fully interchangeable with one another when rotated approximately 180° about the vessel's vertical axis.

4. The bulk transport apparatus of claim 2, wherein:

each pressure vessel is arranged in tandem and provided with a plurality of symmetrically positioned piping brackets located about the periphery of the side walls at preselected locations.

5. The bulk transport apparatus of claim 2, wherein:

each pressure vessel is arranged in tandem and provided with means for removably and interchangeably securing each pressure vessel to either of the vessel positions within the tandem arrangement.

6. A bulk material transport truck, comprising:

a chassis having a pair of bulk material pressure vessels removable and interchangeably mounted in tandem thereon, each vessel includes a top portion having an apex, a side wall portion, and a bottom portion having an apex;

each pressure vessel includes a sealable operator access hatch opening located on the top portion thereof and being offset from the apex of the top portion;

each pressure vessel includes a first port located in the top portion thereof and being offset from the apex of the top portion;

each pressure vessel having a second port located in the top portion thereof, being offset from the apex of the top portion, and being located opposite the first port with respect to the apex of the top portion;

each pressure vessel having a discharge port located in the bottom portion thereof;

each pressure vessel having an air inlet means for introducing pressurized air into the interior of the respective vessel;

each pressure vessel having vent pipe means removably attached to one of the ports located on the top portion thereof, wherein each vent pipe means is routed to converge and eventually join with the adjacent vent pipe means at a preselected position between each vessel on a preselected side thereof;

each pressure vessel having bulk material inlet pipe means removably attached to one of the remaining ports located on the top portion thereof, wherein each material inlet pipe means is routed to converge and eventually join with the adjacent bulk material inlet pipe means at a preselected position between each vessel on a preselected side thereof;

each pressure vessel having bulk material discharge pipe means removably attached to one of the discharge ports located on the bottom portion thereof, wherein each bulk material discharge pipe means is routed generally parallel to the mobile base on a preselected side thereof; and an operator platform positioned at a preselected distance from the offset hatch openings and within such proximity of the offset hatch openings so as to enable an operator positioned on the operator platform to gain access to the interior of the pressure vessels through the hatch openings without having to step off the platform.

7. The bulk transport truck of claim 6, wherein:

each vessel being provided with a second discharge port symmetrically located and positioned opposite the first discharge port enabling each of the vessels arranged in tandem to maintain full interchangeability with one another when rotated approximately 180° about the vessel's vertical axis.

8. The bulk transport truck of claim 6, wherein:

each vessel being provided with a plurality of symmetrically positioned piping brackets located about the periphery of the side walls at preselected locations.

9. The bulk transport truck of claim 6, wherein:

the pressure vessels each have a rated capacity of 200 cubic feet.

10. The bulk transport truck of claim 6, further comprising:

a separator mounted on the chassis, wherein the separator is in fluid communication with the discharge port of each pressure vessel;

valve means located in the vent pipe means connected to each pressure vessel; and valve means located in the material inlet means connected to each pressure vessel.

11. A bulk material transport trailer towable by a tractor, comprising:

a trailer chassis having a pair of bulk material pressure vessels removably and interchangeably mounted in tandem thereon, each paired vessel having a top portion with an apex, a side wall portion, and a bottom portion with an apex;

each pressure vessel having a sealable operator access hatch opening located on the top portion thereof and being offset from the apex of the top portion;

each pressure vessel having a first port located in the top portion thereof and being offset from the apex of the top portion;

each pressure vessel having a second port located in the top portion thereof, being offset from the apex of the top portion, and being located opposite the first port with respect to the apex of the top portion;

each pressure vessel having a discharge port located in the bottom portion thereof;

each pressure vessel having an air inlet means for introducing pressurized air into the interior of the respective vessel;

each pressure vessel having vent pipe means removably attached to one of the ports located on the top portion thereof, wherein each vent pipe means is routed to converge and eventually join with the adjacent vent pipe means at a preselected position between each vessel on a preselected side thereof;

each pressure vessel having bulk material inlet pipe means removably attached to one of the remaining ports located on the top portion thereof, wherein each material inlet pipe means is routed to converge and eventually join with the adjacent bulk material inlet pipe means at a preselected position between each vessel on a preselected side thereof;

each pressure vessel having bulk material discharge pipe means removably attached to one of the discharge ports located on the bottom portion thereof, wherein each bulk material discharge pipe means is routed generally parallel to the mobile base on a preselected side thereof; and an operator platform positioned at a preselected distance from the offset hatch openings and within such proximity of the offset hatch openings so as to enable an operator positioned on the operator platform to gain access to the interior of the pressure vessels through the hatch openings without having to step off the platform.

12. The bulk transport trailer of claim 11, wherein:

each pressure vessel is provided with a second discharge port being symmetrically located and positioned opposite the first discharge port enabling each of the vessels arranged in tandem to maintain full interchangeability with one another when rotated approximately 180° about the vessel's vertical axis.

13. The bulk transport trailer of claim 11, wherein:

each pressure vessel is provided with a plurality of symmetrically positioned piping brackets located about the periphery of the side walls at preselected locations.

14. The bulk transport trailer of claim 11, wherein:

the pressure vessel have a rated capacity of 330 cubic feet.

15. The bulk transport trailer of claim 11, further comprising:

a separator mounted on the chassis, wherein the separator is in fluid communication with the discharge ports of each pressure vessel;

valve means located in the vent pipe means connected to each pressure vessel; and valve means located in the material inlet means connected to each pressure vessel.

* * * * *